US006923722B2

United States Patent
Yamada et al.

(10) Patent No.: US 6,923,722 B2
(45) Date of Patent: Aug. 2, 2005

(54) GAME SYSTEM AND GAME PROGRAM FOR PROVIDING MULTI-PLAYER GAMEPLAY ON INDIVIDUAL DISPLAYS AND A COMMON DISPLAY

(75) Inventors: Yoichi Yamada, Kyoto (JP); Daiki Iwamoto, Kyoto (JP); Kouichi Kawamoto, Kyoto (JP); Naoki Koga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 10/653,941

(22) Filed: Sep. 4, 2003

(65) Prior Publication Data

US 2004/0224739 A1 Nov. 11, 2004

(30) Foreign Application Priority Data

May 9, 2003 (JP) ........................................ 2003-131659

(51) Int. Cl.[7] ............................................... A63F 13/00
(52) U.S. Cl. ............................................. 463/30; 463/1
(58) Field of Search ................................ 463/1, 30, 31, 463/34, 35, 37, 38, 40, 43; 273/148 B

(56) References Cited

U.S. PATENT DOCUMENTS 6,540,614 B1 * 4/2003 Nishino et al. ................ 463/40

FOREIGN PATENT DOCUMENTS

| EP | 0 872 266 | 10/1998 |
| JP | 2003-53038 | 2/2003 |
| WO | WO 93/23125 | 11/1993 |

* cited by examiner

Primary Examiner—Kim Nguyen
(74) Attorney, Agent, or Firm—Nixon & Vanderhye P.C.

(57) ABSTRACT

A game system with a high entertainment value, in which a plurality of player character are played by a plurality of players, and a game program for such a game system are provided. A plurality of individual displays provided to players and a common display commonly provided to all players are provided. Each player character is moved between a first game map and a second game map upon satisfaction of a predetermined condition. A player character located on the first game map and at least a part of the first game map are displayed on the common display. A player character located on the second game map and at least a part of the second game map are displayed on an individual display provided to a player operating that player character.

23 Claims, 13 Drawing Sheets

GROUND MAP COORDINATES

DUNGEON MAP COORDINATES

FIG. 7A

| CONNECTING POINT ON GROUND MAP | DESTINATION POINT ON SUB-MAP ||
|---|---|---|
| | TYPE OF SUB-MAP | DESTINATION POINT |
| DUNGEON-MAP ENTRANCE 1 3 0 a | DUNGEON MAP | GROUND-MAP ENTRANCE 2 3 0 a |
| DUNGEON-MAP ENTRANCE 1 3 0 b | DUNGEON MAP | DUNGEON MAP COORDINATES (X1 Y1) |
| HOUSE-MAP ENTRANCE 1 3 0 c | HOUSE MAP | GROUND-MAP ENTRANCE X |
| CASTLE-MAP ENTRANCE 1 3 0 d | CASTLE MAP | GROUND-MAP ENTRANCE Y |

FIG. 7B

| CONNECTING POINT ON SUB-MAP || DESTINATION POINT ON GROUND MAP |
|---|---|---|
| TYPE OF SUB-MAP | CONNECTING POINT | |
| DUNGEON MAP | GROUND-MAP ENTRANCE 2 3 0 a | DUNGEON-MAP ENTRANCE 1 3 0 a |
| HOUSE MAP | GROUND-MAP ENTRANCE X | HOUSE-MAP ENTRANCE 1 3 0 c |
| CASTLE MAP | GROUND-MAP ENTRANCE Y | CASTLE-MAP ENTRANCE 1 3 0 d |

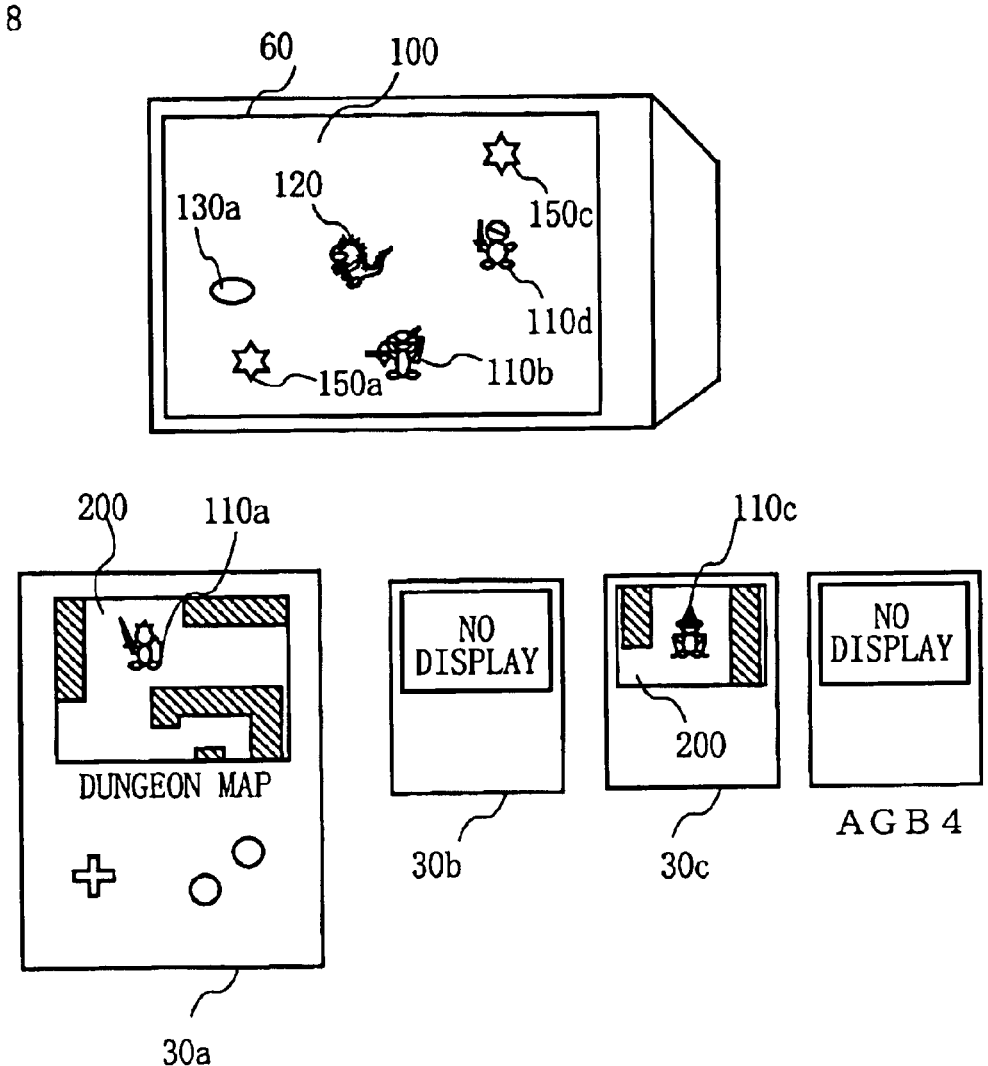

US 6,923,722 B2

GAME SYSTEM AND GAME PROGRAM FOR PROVIDING MULTI-PLAYER GAMEPLAY ON INDIVIDUAL DISPLAYS AND A COMMON DISPLAY

TECHNICAL FIELD

The present technology described herein relates to game systems and game programs. More specifically, the present technology described herein relates to a game system and a game program having a plurality of display mechanisms.

BACKGROUND AND SUMMARY

A game system having a plurality of display mechanisms is disclosed in Japanese Patent Laid-Open Publication No. 2003-53038. This game system includes a first display for displaying a first game world and second display for displaying a second game world. While a player character is located in the first game world, the player character is displayed on the first display. While a player character is located in the second game world, the player character is displayed on the second display.

There have been game systems in which a plurality of players operate a plurality of player characters. In such game systems, players play a game influencing each other through cooperation or battle, thereby increasing the game entertainment value.

The game system disclosed in the above Japanese Patent Laid-Open Publication No. 2003-53038 basically assumes that only one player plays a game. No consideration is given to applying the game system to a case where a plurality of player characters appear.

Therefore, a feature of the present exemplary embodiments is to provide a game system with a high entertainment value and having a plurality of displays, wherein a plurality of player characters are controlled by a plurality of players, and a game program for such a game system.

The present exemplary embodiments have the following features to attain the feature mentioned above.

A first aspect of the present exemplary embodiments is directed to a game system (game system 10; hereinafter, a term(s) in parentheses indicate(s) the corresponding component(s) in the embodiment described further below) to be played by a plurality of players. This game system includes a plurality of operating mechanisms (operation switches 36 provided to each of game machines 30*a* through 30*d*) provided to the players, a plurality of individual displays (LCD 35 provided to each of the game machines 30*a* through 30*d*) provided to the players, and a common display (television monitor 60) commonly provided to the players. In this game system, a plurality of player characters (player characters 110*a* through 110*d*) appear on game maps, and these player characters are controlled by each corresponding player operating each corresponding operating mechanism. The game system includes: first game map data storage devices (DVD 50 and RAM 22) which include locations for storing data for displaying a first game map (ground map 100); second game map data storage devices (DVD 50 and RAM 32) which include locations for storing data for displaying at least one second game map (dungeon map 200, house map, or castle map); inter-game-map movement processing control mechanism (CPU 21 executing steps S107, S109, S113, and S115) which moves the player characters individually between the first game map and the second game map upon satisfaction of a predetermined condition; common display control mean mechanism (CPU 21 executing steps S139 and S147) which displays player characters located on the first game map and at least a part of the first game map on the common display; and individual display control mechanism (CPU 31 executing steps S217 and S221) which controls the display of a player character located on the second game map and at least a part of the second game map on the individual display provided to a player operating the player character located on the second game map. Note that the number of common displays provided is typically one. Also, in general, the second game map is different from the first game map.

Each player character is controlled by each of the plurality of players operating each operating mechanism. Also, individual displays are provided for each player. The player character located on the first game map is displayed on the common display, while the player character located on the second game map is displayed on the individual display of the player operating that player character.

According to the first aspect, it is possible to provide a game with a high entertainment value in which a plurality of player characters can appear and disappear among a plurality of displays. Also, the first game map displayed on the common display and the second game map displayed on the individual displays are provided. The player character that has been displayed on the common display can disappear therefrom and then appear on the individual displays, and the player character that has been displayed on the individual display can disappear therefrom and then appear on the common display. This makes the player feel as if his or her player character is moving among the game maps. Also, with an individual display being provided for each player, each player character can freely move among the game maps.

In a second aspect, the first game map and the second game map each include at least one connecting point (dungeon entrances 130*a* and 130*b*, house entrance 130*c*, castle entrance 130*d*, or ground-map entrance 230*a*). The connecting point (dungeon entrances 130*a* and 130*b*, house entrance 130*c*, or castle entrance 130*d*) of the first game map corresponding to a predetermined point (ground-map entrance 230*a*, dungeon-map coordinates (X1, Y1), ground-map entrance X, or ground-map entrance Y) on the second game map and the connecting point (ground-map entrance 230*a*, ground-map entrance X, or ground-map entrance Y) of the second game map corresponding to a predetermined point (dungeon entrances 130*a*, house entrance 130*c*, or castle entrance 130*d*) on the first game map (FIG. 7). Upon arrival of the player character at the connecting point on the first game map, the inter-game-map movement control mechanism moves the player character to the predetermined point on the second game map corresponding to the connecting point (CPU 21 executing steps S107 and S109). Also, upon arrival of the player character at the connecting point on the second game map, the inter-game-map movement control mechanism moves the player character to the predetermined point on the first game map corresponding to the connecting point (CPU 21 executing steps S113 and S115). The connecting point is a point upon arrival at which the player character moves to another game map (a point as an entrance to anther game map).

According to the second aspect, upon arrival at the connecting point, the player character moves to another game map. This clarifies the condition on which the player character moves, thereby facilitating the progress of the game.

In a third aspect, the second game map data storage device stores a plurality of said second game maps (dungeon map

200, house map, and castle map). The connecting point on the first game map corresponds to a predetermined point on any one of the plurality of said second game maps (FIG. 7).

According to the third aspect, upon arrival at a connecting point on the first game map, the player character does not always move to the same single second game map. Upon arrival at one connecting point, the player character moves to a point on one second game map, but upon arrival at another connecting point, the player character moves to a point on another second game map. With this, it is possible to provide a game with a high entertainment value.

In a fourth aspect, the second game map data storage location stores a plurality of said second game maps a dungeon map, house map, and castle map). Based on a second game map on which a player character is located, the individual display control mechanism selects, from the plurality of said second game maps, the second game map on which the player character is located, and causes the selected second game map to be displayed on the individual display provided to a player who operates the player character located on the second game map.

According to the fourth aspect, an individual display is provided for each player. Also, each individual display can display each different second game map. Therefore, each player character can freely move to each different second game map. Furthermore, since each display can display various game maps, it is possible to provide a versatile game with a high entertainment value.

In a fifth aspect, the common display control mechanism determines a display range of the first game map so that all player characters located on the first game map can be displayed on the common display (CPU 21 executing step S137).

According to the fifth aspect, the common display displays all player characters located on the first game map. Therefore, all player characters are displayed on at least any of the displays, thereby avoiding inconvenience.

In a sixth aspect, each point on the first game map corresponds to any one point on the second game map. The common display control mechanism generates a predetermined display (150*a*, 150*b*) of a player character located on the second game map, at a point on the first game map corresponding to a point on the second game map at which the player character is located (CPU 21 executing step S141).

According to the sixth aspect, by viewing a game image displayed on the common display, it is possible to know the location of the player character on the second game map. Also, the correspondence between the first game map and the second game map is presented to the user, thereby enabling a game image with a high entertainment value to be displayed.

In a seventh aspect, in addition to the player characters, an enemy character can appear on the game maps. Also, each point on the first game map corresponds to any one point on the second game map. A player character located on the first game map can have an influence on any other player character and an enemy character located on the second game map, and a player character located on the second game map can have an influence on any other player character and an enemy character located on the first game map (CPU 21 executing step S125).

According to the seventh aspect, it is possible to provide a game with a high entertainment value in which player characters can have an influence on each other among different game maps.

In an eighth aspect, the game system further includes a plurality of portable game machines (second game machines 30*a* through 30*d*) provided to the players. The operating switches included in each of the portable game machines functions as the operating mechanisms, and the LCD display included in each of the portable game machines functions as the display.

According to the eighth aspect, with the use of portable game machines, the game system of the present exemplary embodiments can be easily structured.

A ninth aspect is directed to a computer-readable recording medium for recording a game program for a game system to be played by a plurality of players. This game system includes a plurality of operating mechanisms provided to the players, a plurality of individual displays provided to the players, and common display commonly provided to the players. In the game system, a plurality of player characters appear on game maps, and these player characters are controlled by each corresponding player operating each corresponding operating mechanisms. The game program causes the game system to function as: first game map data storage device which stores data for displaying a first game map; second game map data storage device which stores data for displaying at least one second game map; inter-game-map movement control mechanism which moves the player characters individually between the first game map and the second game map upon satisfaction of a predetermined condition; a common display control mechanism which displays player characters located on the first game map and at least a part of the first game map on the common display; and individual display control mechanism which displays a player character located on the second game map and at least a part of the second game map on individual displays provided to a player corresponding to the player character located on the second game map.

According to the ninth aspect, the effects achieved by the first aspect can also be achieved.

These and other objects, features, aspects and advantages of the present exemplary embodiments will become more apparent from the following detailed description of the present exemplary embodiments when taken in conjunction with the accompanying drawings.

BRIEF DESCRIPTION OF THE DRAWINGS

FIGS. 7A and 7B are illustrations for describing tables containing connecting points;

FIG. 8 is an illustration showing examples of game images displayed on a television monitor 60 and LCDs 35;

DESCRIPTION OF EXEMPLARY NON-LIMITING EMBODIMENTS

Figure 1:
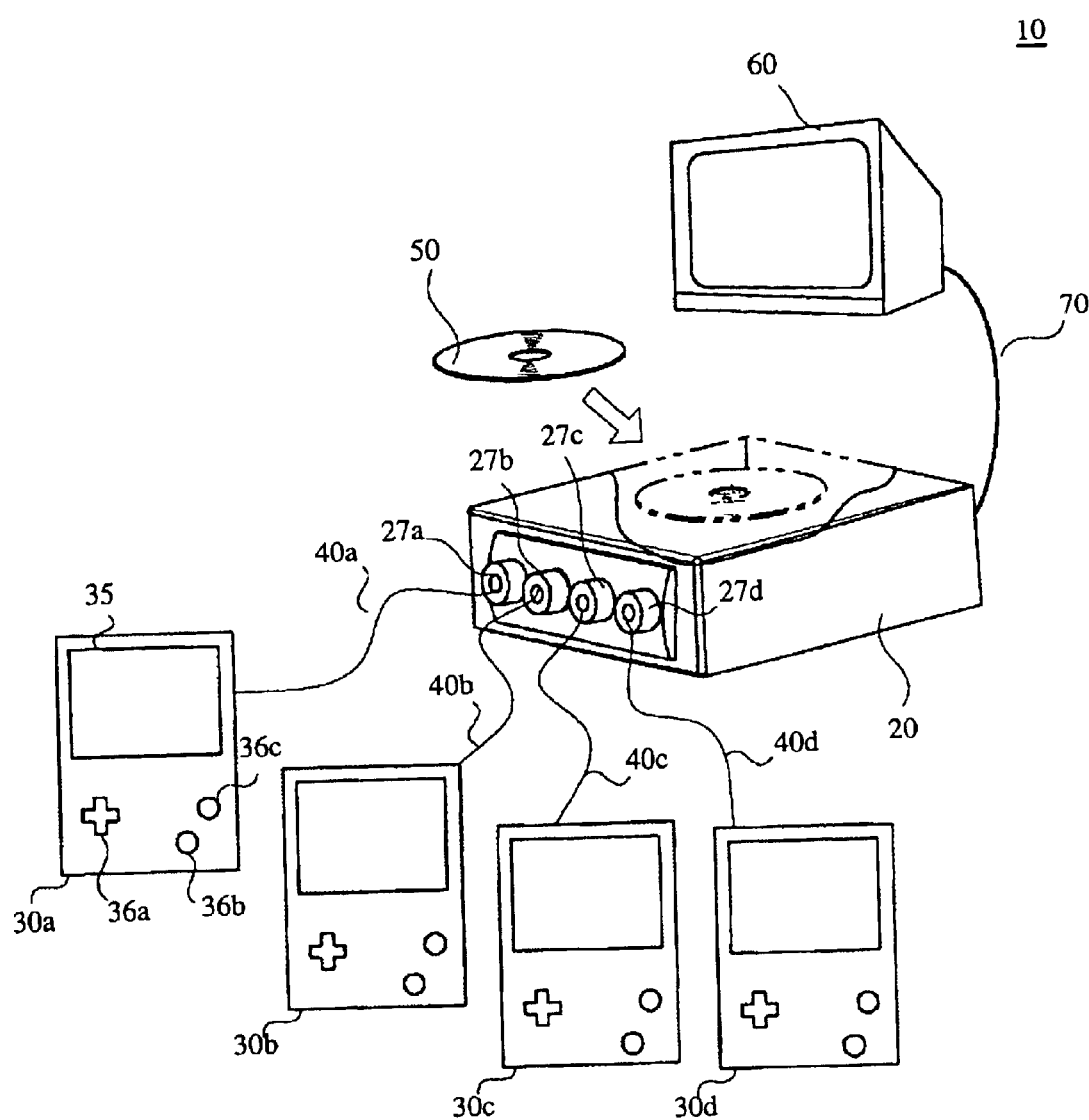
FIG. 1 is an external view of a game system 10 according to one exemplary non-limiting embodiment.

FIG. 1 is an external view of a game system 10 according to one present exemplary non-limiting embodiment. The game system 10 includes a first game machine 20, second game machines 30a through 30d, cables 40a through 40d connecting the first game machine 20 and each of the second game machines 30 (30a through 30d), a DVD 50, a television monitor 60, and a cable 70 for connecting the first game machine 20 and the television monitor 60 to each other. The first game machine 20 is a fixed-type game machine. The second game machines 30a through 30d are portable-type game machines. The first game machine 20 has four connectors 27 (27a through 27d) each connectable to a game controller not shown. The game machines 30a through 30d are connected via the cables 40a through 40d to these connectors 27a through 27d, respectively. The first game machine 20 has exchangeably inserted therein the DVD 50. Video and audio outputs from the first game machine 20 are produced via the cable 70 to the television monitor 60. The second game machines 30a through 30d each include an LCD 35 and operation switches 36a through 36c.

Figure 2:
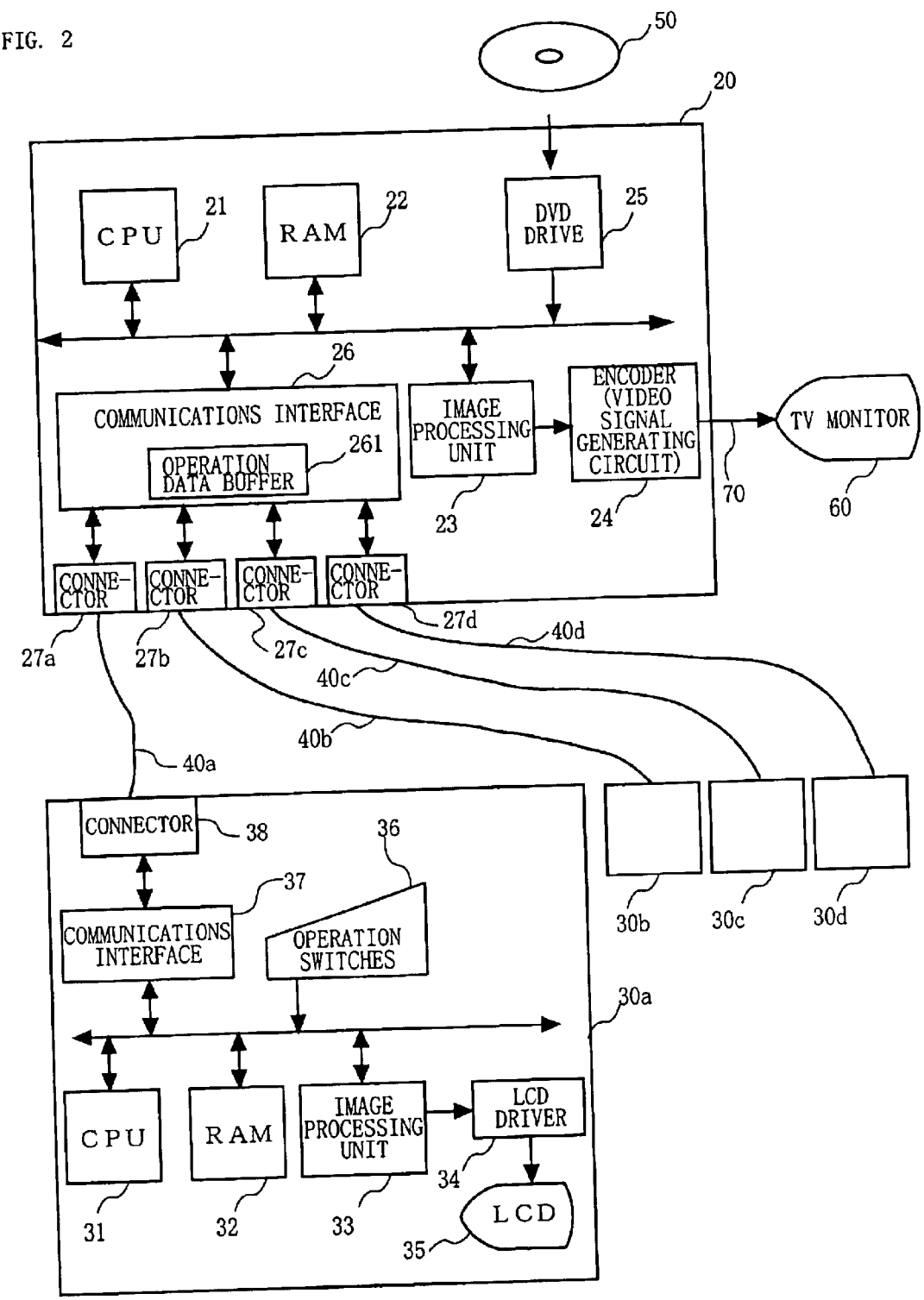
FIG. 2 is a block diagram illustrating the game system 10.

FIG. 2 is a block diagram illustrating the game system 10. The first game machine 20 includes a CPU 21, RAM 22, an image processing unit 23, a DVD drive 25, and a communication interface 26, which are connected to each other via a bus. Furthermore, the image processing unit 23 has connected thereto an encoder 24, from which a video signal is output via the cable 70 to the television monitor 60. Still further, the communications interface 26 includes an operation data buffer 261 connected via connectors 27a through 27d and the cables 40a through 40d to the second game machines 30a through 30d. Note that the image processing unit 23 is not necessarily required, and its function can be achieved by the CPU 21.

The DVD 50 has stored therein a game program and game data for the first game machine 20b and a game program and game data for the second game machines 30. The game program and game data are read by the DVD drive 25 when appropriate, and are then stored in the RAM 22. The CPU 21 executes a game process based on the data stored in an area of the RAM 22. Game data resulting from the execution of the game process by the CPU 21 is stored in another area of the RAM 22. The image processing unit 23 generates display data based on the data generated by the CPU 21 and then stored in the RAM 22, and then outputs the generated display data to the encoder 24. The encoder 24 outputs a video signal via the cable 70 to the television monitor 60.

Data to be transmitted from the first game machine 20 and the second game machines 30a through 30d is output from the CPU 21 via the communications interface 26, the connectors 27a through 27d, and the cables 40a through 40d. Data to be transmitted from the second game machines 30a through 30d to the first game machine 20 is output to the CPU 21 via the cables 40a through 40d, the connectors 27a through 27d, and the communications interface 26. Operation data of the operation switches 36 of each of the second game machines 30a through 30d is transmitted via the cables 40a through 40d and the connectors 27a through 27d, respectively, for storage in the operation data buffer 261.

Each of the second game machines 30 includes a CPU 31, RAM 32, an image processing unit 33, the operation switches 36, and a communications interface 37, which are connected to each other via a bus. Furthermore, the image processing unit 33 has connected thereto an LCD driver 34, to which the LCD 35 is connected. Still further, the communications interface 37 is connected via the connector 38 and the cable 40 to the first game machine 20.

Of the data stored in the DVD 50, the game program and game data for the second game machines 30 is read by the first game machine 20, transferred to the second game machines 30, and is then stored in an area of the RAM 32. The CPU 31 reads the game program and game data stored in the RAM 32 for execution of a game process. At this time, game data newly generated by the CPU 31 is stored in another area of the RAM 32. The image processing unit 33 generates display data based on the data generated by the CPU 31 and then stored in the RAM 32, and then outputs the generated display data to the LCD driver 34. The LCD driver 34 drives the LCD 35 for image display. Data to be transmitted to the first game machine 20 is transmitted from the CPU 31 via the communications interface 27, the connector 38, and the cable 40. Also, data to be transmitted from the first game machine 20 is received by the CPU 31 via the connector 38 and the communications interface 37. Note that the image processing unit 33 is not necessarily required, and its function can be achieved by the CPU 31.

Furthermore, the second game machines 30a through 30d have the same structure.

An outline of a game executed in the above-described game system is illustrated in FIGS. 3 through 6, and FIGS. 7A and 7B. This game proceeds with the use of a ground map as a main map, and a dungeon map, a house map, and a castle map as sub-maps, in a manner such that an operation of the control switches 36 by each players controls the movement of each player character so that the player character is appropriately moved among the main map and the sub maps to beat an enemy character or get an item.

Each player is given a second game machine 30. Since the second game machine 30 is provided with the LCD 35, each player has his or her own screen (LCD35). In the present embodiment, it is assumed that there are four players (players a through d) and four player characters 110a through 110d. The player a operating the player character 110a is given the second game machine 30a. The player b operating the player character 110b is given the second game machine 30b. The player c operating the player character 110c is given the second game machine 30c. The player d operating the player character 110d is given the second game machine 30d. Each player operates the operation switches 36 of his or her second game machine 30 to control his or her own player character. The state of the main map is displayed on the television monitor 60. The state of a sub map is displayed on the LCD 35 of each second game machine 30.

While the player character is located on a sub map, the screen (LCD 35) dedicated to the player operating the player character has displayed thereon the sub map including the player character. While the player character is located on the main map, the screen (LCD 35) dedicated to the player operating the player character may be blank, or may have displayed thereon a sentence such as "the character is on the ground map" or "the character is being displayed on the television monitor".

To view the state of the main map (while the player character is located on the main map, for example), each player plays the game as viewing the television monitor 60. While the player character is located on a sub-map when the player desires to view the state of the sub-map, the player plays the game as viewing a display on the LCD of his or her own second game machine 30.

Each player character is displayed on the television monitor 60 while it is located on the main map. When the player character moves from the main map to a sub-map, the player character disappears from the television monitor 60, and appears instead on the screen (LCD 35) dedicated to the player operating that player character. When the player character moves from the sub-map to the main map, the player character disappears from the LCD 35, and appears instead on the display monitor 60.

Figure 3:
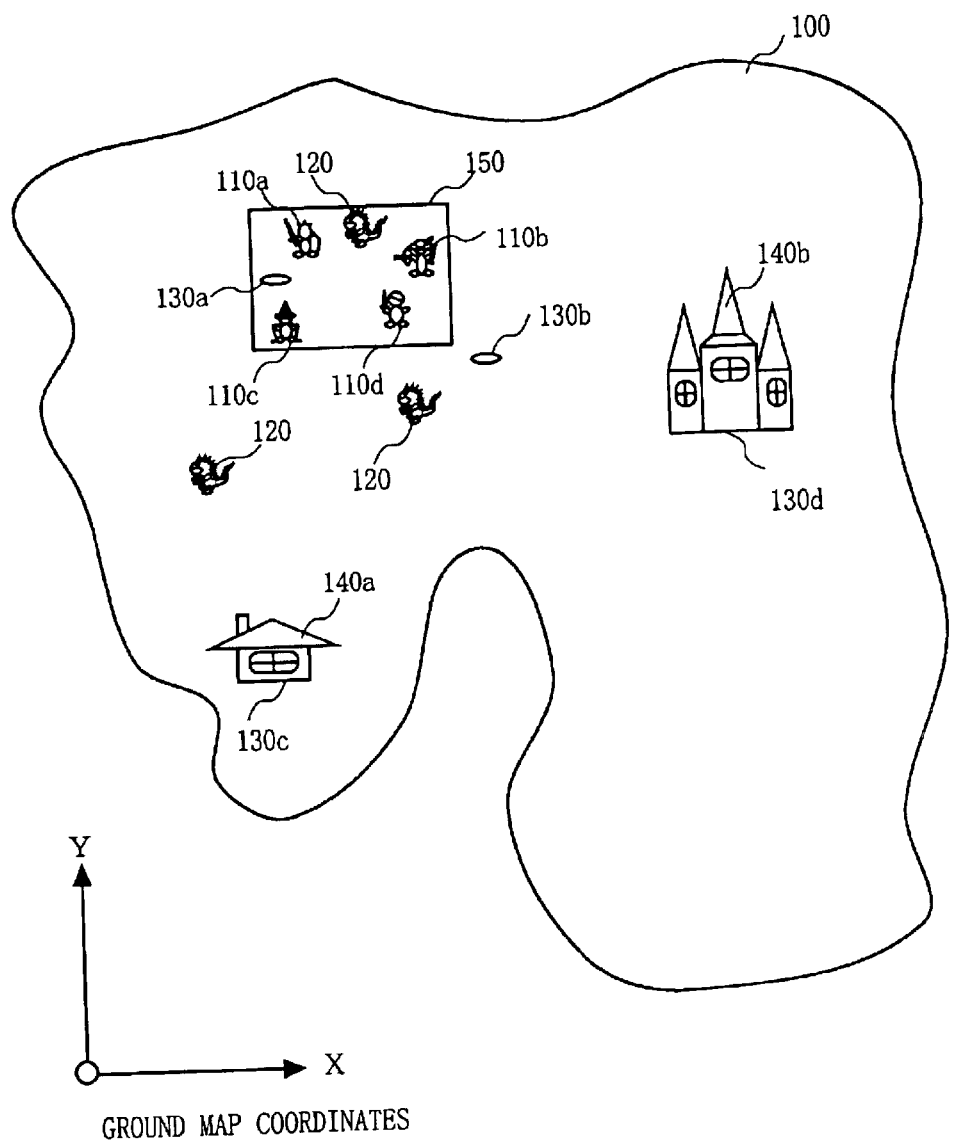
FIG. 3 is an illustration for describing a ground map.

FIG. 3 is an illustration showing the ground map 100, which is an example of a first game map. The ground map is a map mainly used for playing the game. Therefore, in the following description, the ground map is also referred to as a main map. The ground map 100 is extended as shown in FIG. 3, having placed thereon the player characters 110a through 110d (in FIG. 3, all player characters are on the ground map), an enemy character 120, dungeon-map entrances 130a and 130b to a dungeon map, which is one example of connecting points, a house-map entrance 130c to a house map, which is another example of connecting points, a castle-map entrance 130d to a castle map which is still another example of connecting points, a house object 140a, and a castle object 140b. The player characters 110a through 110d and the enemy character 120 are objects moving on the ground map. The connecting points 130a through 130d, the house object 140a, and the castle object 140b are unmoving objects fixed to each predetermined point on the ground map.

This ground map is displayed on the television monitor 60, but not entirely. That is, a partial area is set as a display area 150, and a part of the ground map within the display area 150 and various objects including player characters placed on that part of the ground map are displayed on the television monitor 60.

Taking a predetermined point on the ground map as an origin, ground map coordinates are set. In the example of FIG. 3, the ground map coordinates are two-dimensional coordinates. When the ground map is a three-dimensional map, the ground map coordinates are three-dimensional coordinates.

Figure 4:
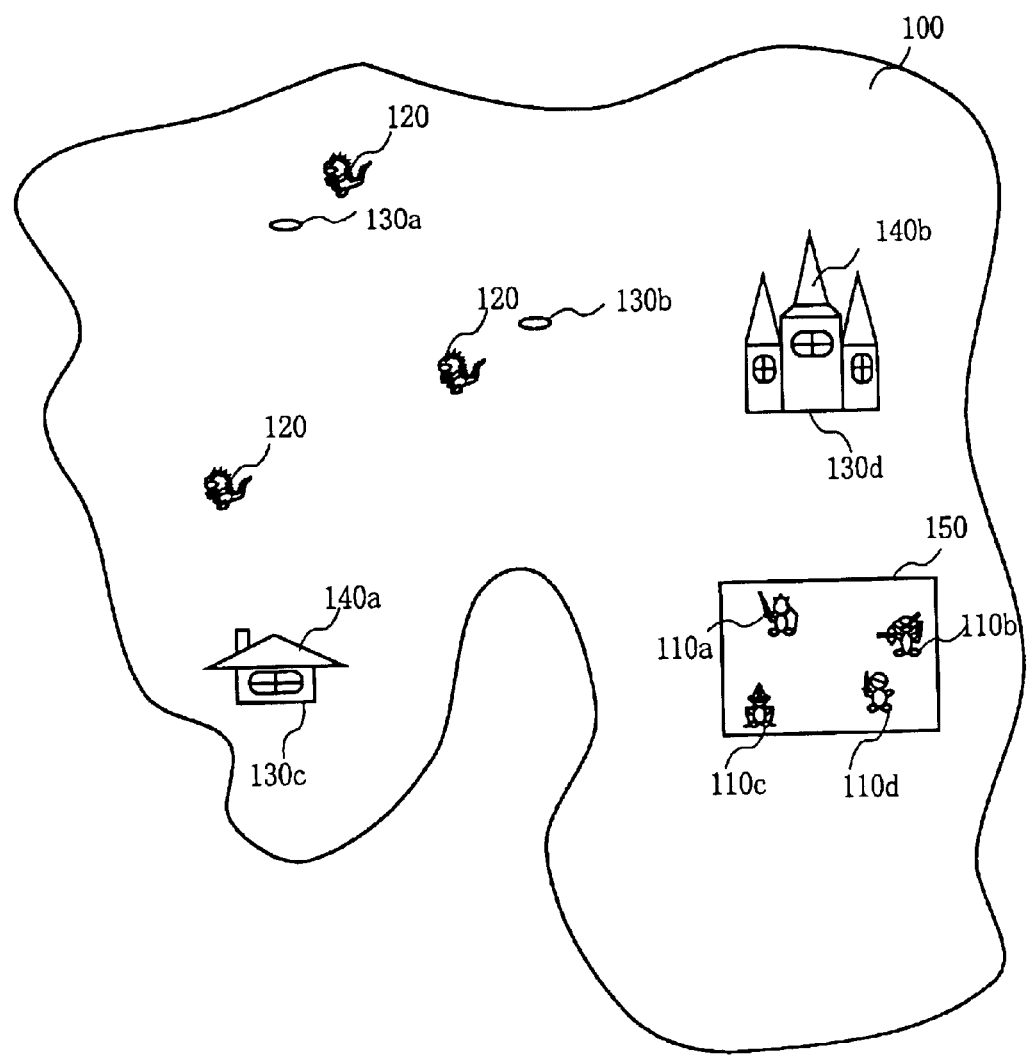
FIG. 4 is an illustration for describing a movement of a display area 150 upon a movement of a player character 110.

The television monitor 60 displays an area surrounding the player characters 110. Therefore, the display area 150 can move as the player characters 110 move, which is illustrated in FIG. 4. As the player characters 110a through 110d move in a lower-right direction on the ground map, the display area 150 moves in the lower-right direction accordingly.

Figure 5:
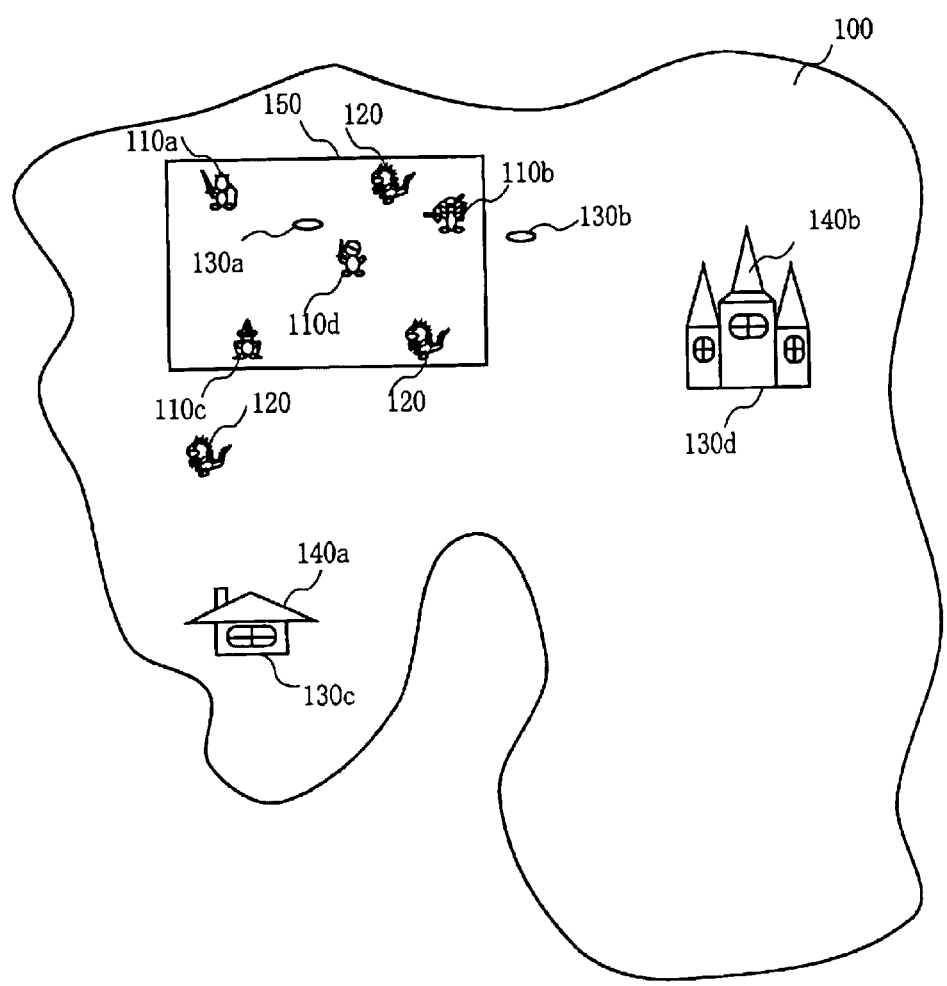
FIG. 5 is an illustration for describing a change in size of the display area 150 when player characters 110 are distanced far apart from each other.

Furthermore, the television monitor 60 displays all player characters 110 located on the ground map. Therefore, when the player characters 110 move in different directions to become distanced far apart from each other, the display area 150 becomes enlarged as illustrated in FIG. 5. With such enlargement of the display area 150, all player characters 110 located on the ground map are displayed on the television monitor 60. Conversely, when the player characters 110 become less distanced apart from each other, the display area 150 is reduced. Note that the ground map and various objects thereon are displayed so as to become smaller when the display area 150 is enlarged, while they are displayed so as to become larger when the display area 150 is reduced.

Figure 6:
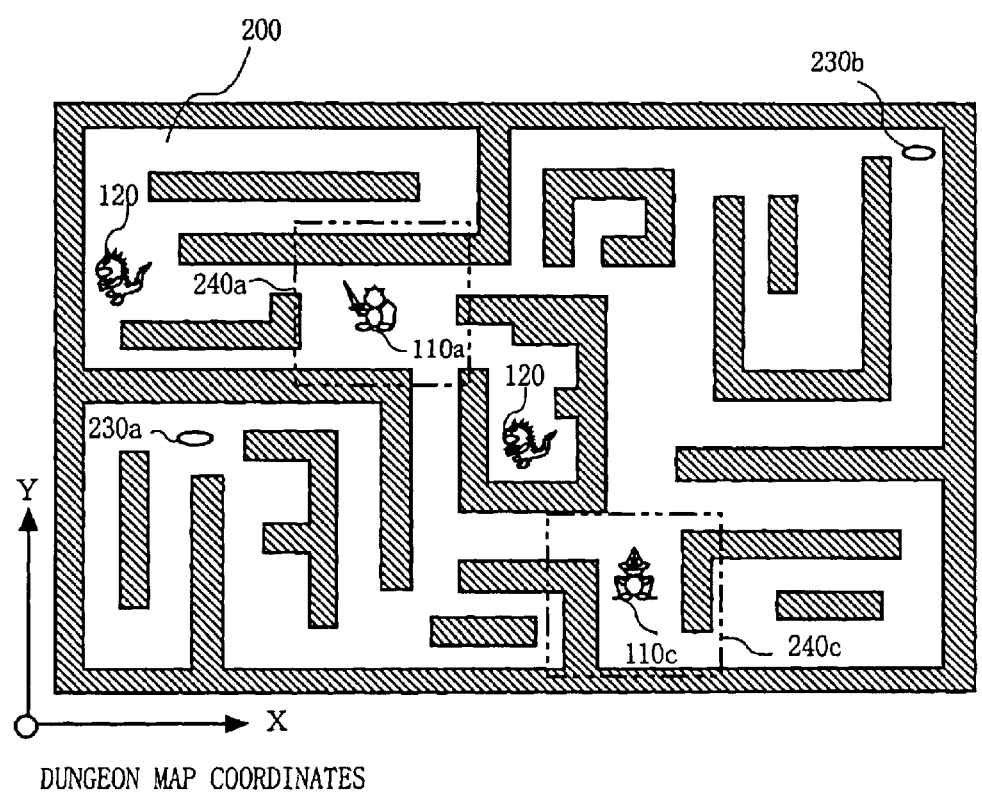
FIG. 6 is an illustration for describing a dungeon map.

FIG. 6 is an illustration showing a dungeon map 200, which is one example of a second game map. FIG. 6 illustrates a state of the dungeon map 200 changed from the state illustrated in FIG. 3 after the player characters 110a through 110c have moved thereto. In this state, the dungeon map 200 has placed thereon the player characters 110a and 110c, the enemy character 120, and a ground-map entrance 230a to the ground map. The player characters 110 and the enemy character 120 are moving objects, while the ground-map entrance 230a is an unmoving object fixed to a predetermined point on the dungeon map.

The dungeon map is displayed on screens (LCDs 35) dedicated to the players operating the player characters located on that dungeon map. Here, what is displayed on each LCD 35 is not the entire dungeon map, but only a part thereof. In the state illustrated in FIG. 6, an area 240a covering a certain area surrounding the player character 110a is displayed on the screen (LCD 35 of the second game machine 30a) dedicated to the player a operating the player character 110a. Also, an area 240c covering a certain area surrounding the player character 110c is displayed on the LCD 35 of the second game machine 30c dedicated to the player c operating the player character 110c. The display area 240 moves as the corresponding player characters move. However, the size of the display area does not have to be changed.

Taking a predetermined point on the dungeon map as an origin, dungeon map coordinates are set. In the example of FIG. 6, the dungeon map coordinates are two-dimensional coordinates. When the dungeon map is a three-dimensional map, the dungeon map coordinates are three-dimensional coordinates. The origin of the dungeon map corresponds to a predetermined point on the ground map. For example, the origin of the dungeon map corresponds to a point (20, 10) on the ground map (that is, X=20, Y=10). With this correspondence, it is possible to relate points on the dungeon map to points on the ground map. That is, in this example, a point (Xd, Yd) on the dungeon map corresponds to a point (Xd+20, Yd+10).

The structures of the house map and the castle map are similar to that of the dungeon map, and therefore are not described herein.

When the player character 110 on the ground map comes to the dungeon-map entrance 130a or 130b, the player character 110 moves to the dungeon map illustrated in FIG. 6. Also, when the player character 110 on the dungeon map comes to the ground-map entrance 230a, the player character 110 moves to the ground map illustrated in FIG. 3.

Specifically, a process of moving upon coming to a connecting point is performed with reference to tables of FIGS. 7A and 7B. FIG. 7A is a table which defines points on the sub-maps to which the player character 110 moves upon coming to connecting points on the ground map. That is, the player character 110 moves from the ground map to any one of the sub-maps in accordance with this table. Specifically, upon coming to the point 130a on the ground map, the player-character 110 moves to the point 230a on the dungeon map. Upon coming to the point 130b, the player character 110 moves to a point represented by coordinates (X1, Y1) on the dungeon map. Furthermore, this table is referred to when the player character 110 comes to the house-map entrance 130c or the castle-map entrance 130d for moving to the corresponding point on the house map or the castle map.

FIG. 7B is a table that defines points on the ground map to which the player character moves upon coming to connecting points on sub-maps. That is, the player character 110 moves from a sub-map to the ground map in accordance with this table. Specifically, upon coming to the point 230a on the dungeon map, the player character 110 moves to the point 130a. Furthermore, this table is referred to when the player character 110 comes to a connecting point on the house map or the castle map for moving to the corresponding point on the ground map. Note that the player character can move from the point 130b to the dungeon map, but cannot return to the point 130b after moving from the point 130b to the dungeon map.

FIG. 8 is an illustration showing examples of game images displayed on a television monitor 60 and LCDs 35 of the second game machines 30a through 30d. The television monitor 60 displays a partial area of the ground map 100 (an area surrounding player characters located on the ground map) as a display area. Specifically, all player characters located on the ground map (in FIG. 8, the player characters 110b and 110d) are displayed. Furthermore, of the enemy characters 120 located on the ground map, an enemy character 120 located within the display area is displayed. Still further, of other objects (objects other than player characters and enemy characters) located on the ground map, an object located within the display area (in FIG. 8, the dungeon-map entrance 130a) is displayed. Still further, a part of the ground map within the display area is displayed.

Also, the television monitor 60 may display marks 150a and 150c at locations on the ground map that correspond to the locations of player characters on a sub-map (in FIG. 8, the player characters 110a and 110c, respectively). These marks 150 make it possible to achieve image representations such that the player characters located on the sub-map can be transparently viewed from the ground map (or such that the player characters located on the sub-map cast their shadows on the ground map). As described above, the locations on the ground map that correspond to those on the sub-map are calculated based on the correspondence of map coordinates. The mark 150a is a mark indicative of a location on the ground map corresponding to the location of the player character 110a located on the dungeon map. Similarly, the mark 150c is a mark indicative of a location on the ground map corresponding to the location of the player character 110c located on the dungeon map.

Regarding the player characters 110 located on the sub-map (in FIG. 8, the player characters 110a and 110c), the screens dedicated to the players operating these player characters (in FIG. 8, the LCDs 35 of the second game machines 30a and 30c) each display the corresponding player character, a part of the dungeon map within an area surrounding the player character, and, any enemy character, any other player characters, and any other objects within that area.

The screens dedicated to the players operating the player characters on the ground map (in FIG. 8, the player characters 110b and 110d), that is, the LCDs of the second game machines 30b and 30d in FIG. 8, do not display anything.

In FIG. 8, the player characters 110a and 110c are located on the same sub-map (dungeon map). Alternatively, the player characters can be located on different sub-maps. For example, the player character 110a can be located on the dungeon map, while the player character 110c can be located on the castle map. In this case, the LCD 35 of the second game machine 30a displays the dungeon map, while the LCD 35 of the second game machine 30c displays the castle map.

Furthermore, in FIG. 8, when the player characters 110a and 110c are coming close to each other within a predetermined distance on the dungeon map, the LCD 35 of the second game machine 30a may display the player character 110c, while the LCD 35 of the second game machine 30c may display the player character 110a.

Still further, in FIG. 8, when the player character 110b moves to the dungeon-map entrance 130a, the player character 110b disappears from the television monitor 60, and then appears on the LCD 35 of the second game machine 30b together with the dungeon map.

Still further, in FIG. 8, when the player character 110a moves to the ground-map entrance 230a illustrated in FIG. 6, the player character 110a disappears from the LCD 3 of the second game machine 30a, and then appears on the television monitor 60.

Figure 9:
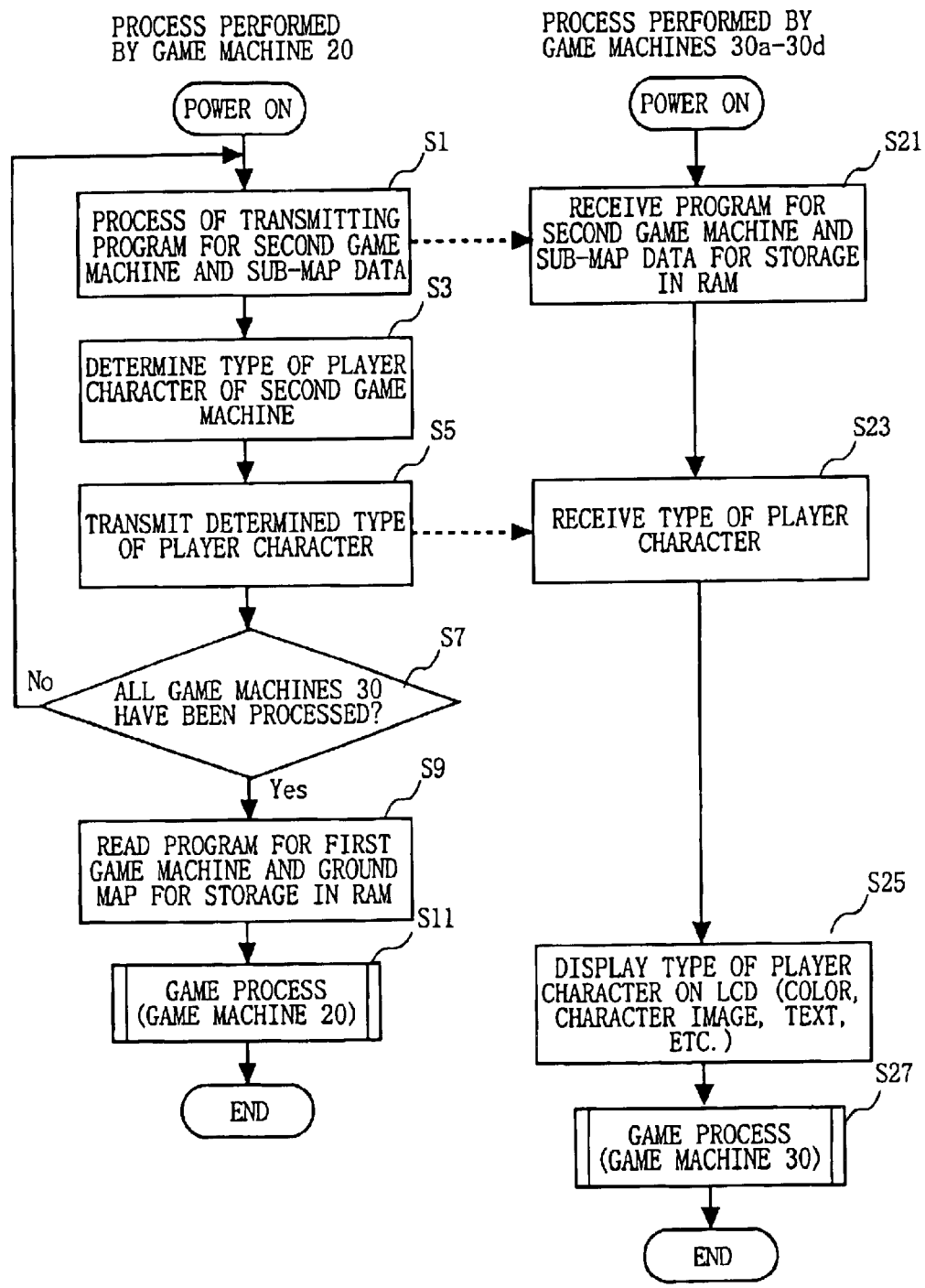
FIG. 9 is a flowchart of a main process performed by a CPU 21 of a first game machine 20 and a CPU 31 of a second game machine 30.

FIG. 9 shows flowcharts for processes of programs executed on the first game machine 20 and each of the second game machines 30. A flowchart shown on left in FIG. 9 shows a process of a program executed by the CPU 21 of the first game machine 20, while a flowchart shown on right therein shows a process of a program executed by the CPU 31 of each of the second game machines 30.

In FIG. 9, when the first game machine 20 is powered on, an initializing process is performed. Then, in step S1, the game program and game data for the second game machines (for example, sub-map data) is read from the DVD 50, and is then transmitted to the second game machines 30. Subsequent to step S1, in step S3, the type of the player character is determined for each second game machine 30. Then, in step S5, the determined type of the player character is transmitted to the respective second game machines 30. Subsequent to step S5, it is determined in step S7 whether all of the second game machines 30a through 30d have been processed in steps S1 to S5. If they have not yet been processed, the procedure returns to step S1 for processing a second game machine 30 not yet processed. That is, by repeating a series of steps S1 to S7, the game program and game data for all of the second game machines 30a through 30d are transmitted, and the type of the player character of each of the second game machines 30a through 30d are determined and then transmitted. Then, the procedure goes to step S9.

In step S9, the game program and game data (for example, ground map data) for the first game machine is read from the DVD 50, and is then stored in the RAM 22. Subsequent to step S9, in step S11, a game process is executed, which will be described further below with reference to FIGS. 10 and 11.

In FIG. 9, when the second game machine 30 is powered on, an initializing process is performed. Then, in step S21, a process of receiving the game program and game data for the second game machines transmitted in the above-described step S1 from the first game machine 20, and storing the received program and data in the RAM 32 is performed. Subsequent to step S21, in step S23, a process of receiving the type of the player character transmitted in the above-described step S5 from the first game machine 20 is performed. Subsequent to step S23, in step S25, each of the second game machines 30a through 30d causes its own LCD to perform a displaying process for presenting the type of the player character received in step S23 to the player. Specifically, a name of the type of the player character, an image of the player character, and colors representing the player character are displayed to present, to the player, the type of the character which the player is going to operate. Subsequent to step S25, in step S27, a game process is performed, which will be described further below with reference to FIG. 12.

Figure 10:
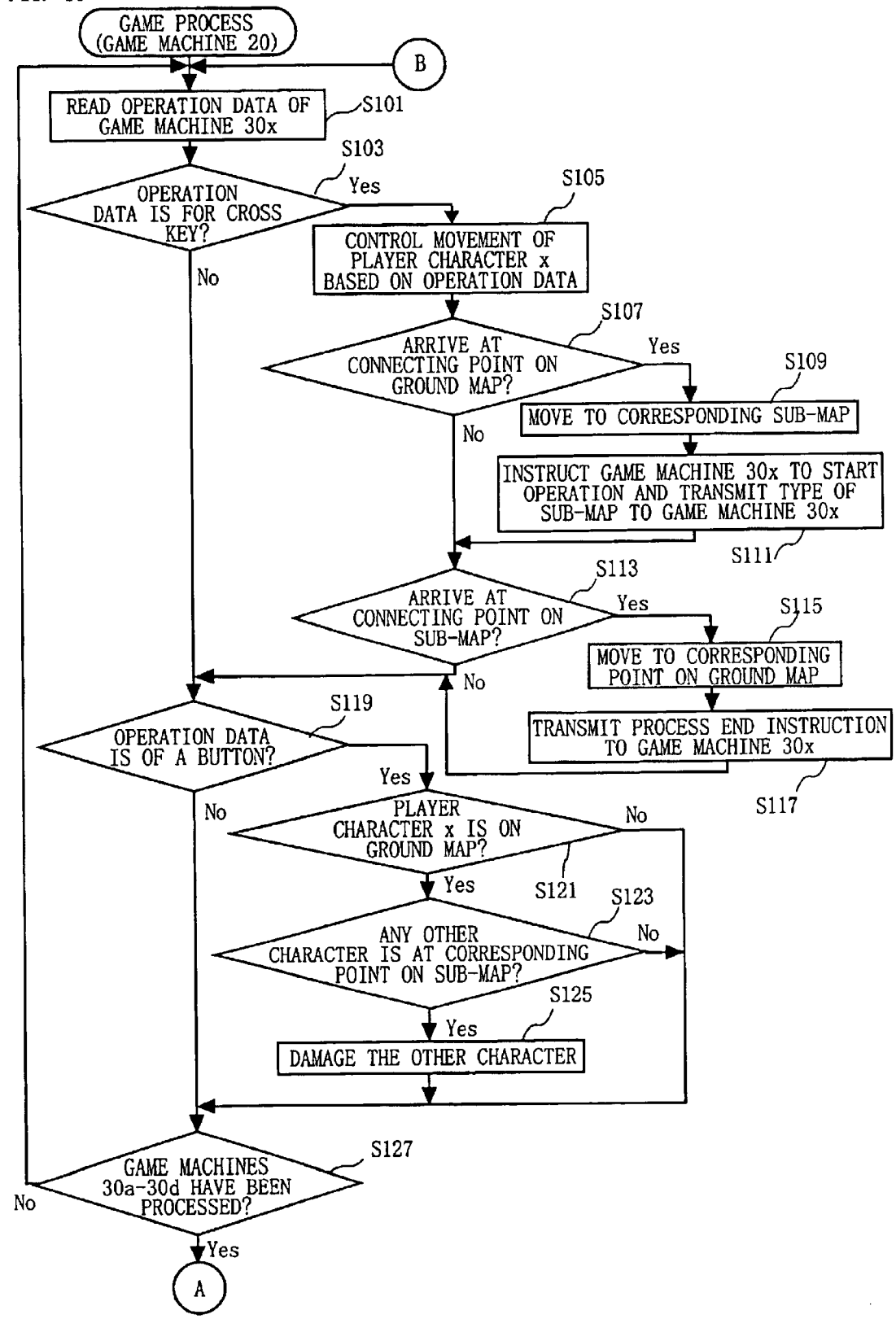
FIG. 10 is a flowchart showing a first half of a game process preformed by the CPU 21 of the first game machine 20.
Figure 11:
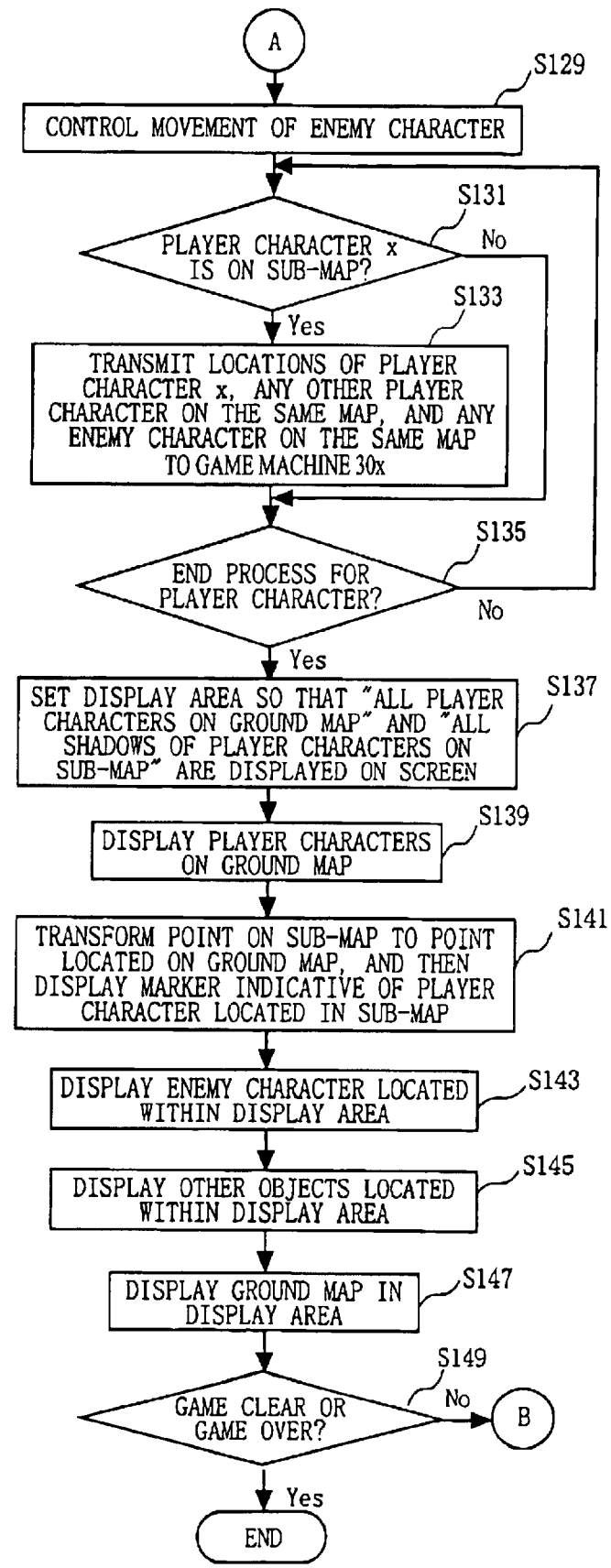
FIG. 11 is a flowchart showing a latter half of the game process performed by the CPU 21 of the first game machine 20.

FIGS. 10 and 11 is a flowchart showing the game process preformed in the above-described step S11 of FIG. 9 by the CPU 21 of the first game machine 20. In this game process, first in step S101, the CPU 21 reads operation data of a second game machine 30x (first, a process is performed for a case where x=a, that is, operation data of the second game machine 30a is read, then x=b, x=c, and x=d. Hereinafter, descriptions are made for an example where x=a). Subsequent to step S101, it is determined in step S103 whether the operation data read in step S101 is operation data of the cross key (the operation switch 36a in FIG. 1). If the read operation data is the operation data of the cross key, the procedure goes to step S105, wherein a control of the movement of the player character a is performed based on the operation data. Specifically, a process of moving the player character upward, downward, rightward, or leftward on the game map, in accordance with an upward, downward, rightward, or leftward operation of the cross key. If the read operation data is not the operation data of the cross key, the procedure goes to step S119.

Subsequent to step S105, it is determined in step S107 whether the player character a has come to a connecting point on the ground map (for example, the dungeon-map entrance 130a in FIG. 3). If the player character a has come to a connecting point, the procedure goes to step S109, wherein a sub-map to which the player character is to move is determined with reference to the tables of FIG. 7A to move the player character a to the corresponding point on the sub-map. Subsequent to step S109, in step S111, a process of instructing the second game machine 30a to start processing and transmitting the type of the destination sub-map determined in step S109 to the second game machine 30a is performed. If the player character a has not come to a connecting point or Subsequent to step S11, the procedure goes to step S113.

In step S113, it is determined whether the player character a has come to a connecting point on the sub-map (for example, the ground-map entrance 230a in FIG. 6). If the player character a has come to a connecting point, the procedure goes to step S115, wherein the corresponding point on the ground map to which the player character is to move is determined with reference to the tables of FIG. 7B to move the player character a to the corresponding point is performed. Subsequent to step S115, in step S117, a process of instructing the second game machine 30a to end processing is performed. If the player character a has not come to a connecting point or Subsequent to step S117, the procedure goes to step S119.

In step S119, it is determined whether the operation data read in step S101 is the operation data of the A button (the operation switch 36b in FIG. 1). If the read operation data is the operation data of the A button, the procedure goes to step S121, wherein it is determined whether the player character a is located on the ground map. If the player character a is located on the ground map, the procedure goes to step S123, wherein it is determined whether any other character (any other player character or any enemy character) is located at the corresponding point on any sub-map. If it is determined that any other character is located at the corresponding point, the procedure goes to step S125, wherein a process of damaging that character (impairing its life, which is one of its attributes) is performed. If it is determined in step S119 that the operation data is not the operation data of the A button, if it is determined in step S121 that the player character a is not located on the ground map, if it is determined in step S123 that no other character is located, or Subsequent to step S125, the procedure goes to step S127.

If the player character a is located on the sub-map when the A button is operated, a process of damaging the other character located at the corresponding point on the ground map may be performed.

In step S127, it is determined whether the process of step S101 to S125 has been performed on all of the second game machines 30a through 30d. If any one of the second game machines has not yet been processed, the procedure returns to step S101 for processing that unprocessed second game machine (the process is performed with x=a, then x=b, x=c, and x=d).

If it is determined in step S127 that all of the second game machines 30a through 30d have been processed, the procedure goes to step S129 of FIG. 11, wherein a process of controlling the movement of the enemy character is performed. The movement of the enemy character is automatically controlled based on a predetermined algorithm defined in the game program. Subsequent to step S129, it is determined in step S131 whether a player character x (first, a process is performed for a case where x=a, then x=b, x=c, and x=d. Hereinafter, descriptions are made for an example where x=a) is located on any sub-map. If it is determined that the player character a is located on any sub-map, the procedure goes to step S133, wherein a process of transmitting the location (X and Y coordinates) of the player character a on the sub-map, a location of any other player character on the same sub-map, and a location of any enemy character on the same sub-map to the second game machine 30a is performed.

Subsequent to step S133, it is determined in step S135 whether the process of steps S131 and S133 has been performed on all of the player characters a through d. If any of the player characters a through d has not yet been processed, the procedure returns to step S131 for processing unprocessed player character (the process is performed with x=b, then x=c and x=d).

If it is determined in step S135 that all player characters have been processed, the procedure goes to step S137, wherein a process of setting the location and size of an area of the ground map to be displayed on the television monitor 60 (the display area 150 in FIG. 3) is performed. Specifically, the display area is set so as to satisfy both of the following conditions: (1) all player characters located on the ground map are displayed on the television monitor 60, and (2) all marks corresponding to the player characters located on any sub-map (the marks 150 in FIG. 8) are displayed on the television monitor 60. Furthermore, specifically, four corners of the display area 150 are determined based on maximum and minimum values of the X and Y coordinates of the location of the player character on the ground map and the locations on the ground map that correspond to the locations of the player characters on the sub-map.

Subsequent to step S137, in step S139, a process of displaying the player character(s) on the ground map on the television monitor 60 is performed. Subsequent to step S139, in step S141, a process of transforming the location of the player character located on the sub-map to the corresponding point on the ground map and then displaying the mark 150 as illustrated in FIG. 8 on the television monitor 60 is performed.

Subsequent to step S141, in step S143, an enemy character located on the ground map within the display area set in step S137 is displayed on the television monitor 60. Subsequent to step S143, in step S145, other objects located on the ground map within the display area set in step S137 are displayed on the television monitor 60. Subsequent to step S145, in step S147, the ground map within the display area set in step S137 is displayed on the television monitor 60. Subsequent to step S147, it is determined in step S149 whether or not the game has been cleared or over. If the game has been cleared or over, the game process ends. Otherwise, the procedure returns to step S101 of FIG. 10 for repeating the process.

Figure 12:
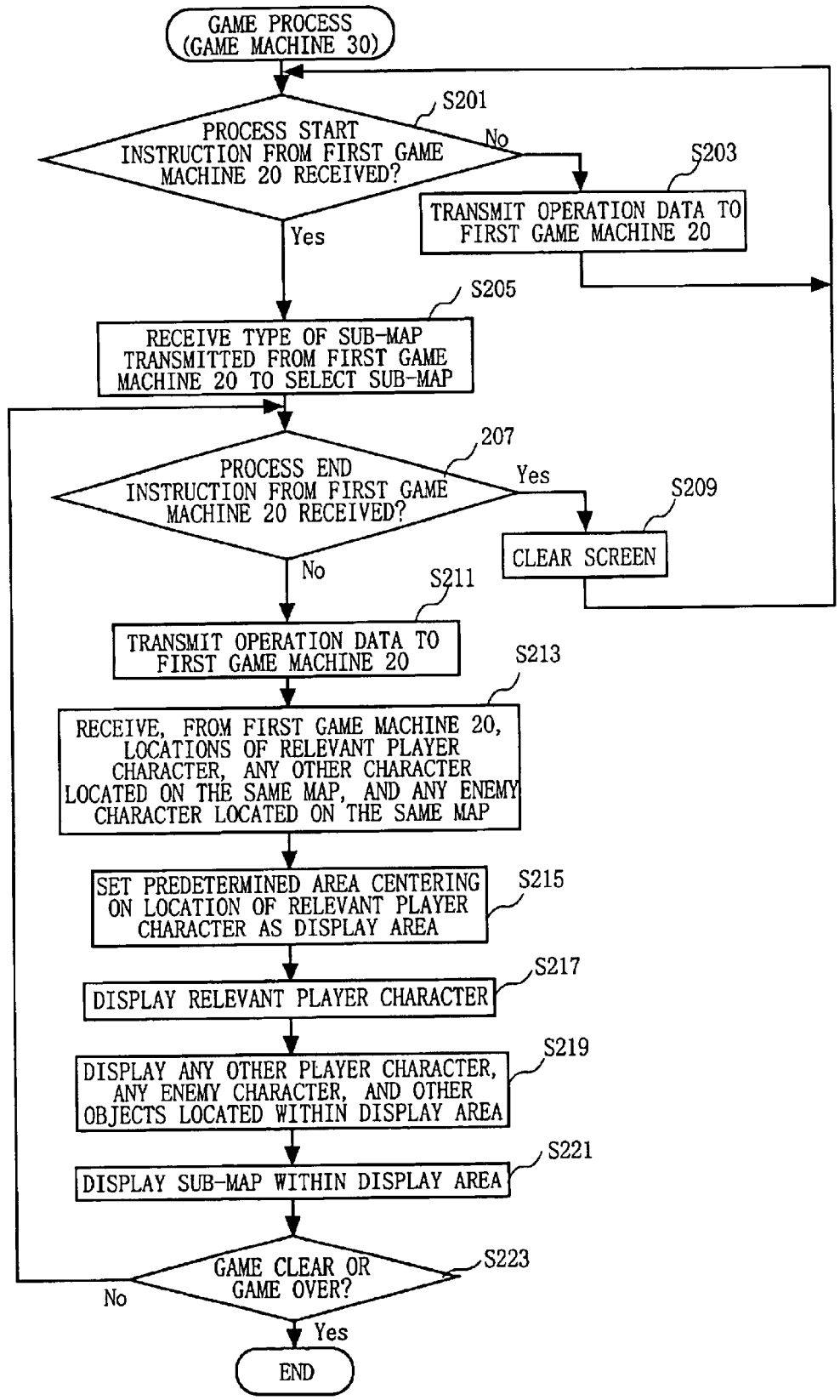
FIG. 12 is a flowchart showing a game process performed by the CPU 31 of the second game machine 31.

FIG. 12 is a flowchart showing the details of the game process performed in the above-described step S27 of FIG. 9 by the CPU 31 of the second game machine 30. In this game process, the CPU 31 first determines in step S201 whether a process start instruction to be transmitted in step S111 of FIG. 10 from the first game machine 20 has been received. If such an instruction has not yet been received, the procedure goes to step S203, wherein a process of transmitting the operation data (data of the operation switches 36a through 36c) to the first game machine 20 is performed. That is, until receiving a process start instruction from the first game machine 20, the second game machine 30 merely performs the process of transmitting the operation data to the first game machine 30.

If a process start instruction has been received, on the other hand, the procedure goes to step S205, wherein a process of receiving the type of the sub-map transmitted in the above-described step S111 of FIG. 10 from the first game machine 20 and then selecting that sub-map from a plurality of sub-maps (the dungeon map, the house map, and the castle map) is performed. Subsequent to step S205, it is determined in step S207 whether a process end instruction to be transmitted in the above-described step S117 of FIG. 10 from the first game machine 20 has been received. If a process end instruction has been received, the procedure goes to step S209, wherein a process of clearing the screen is performed. If a process end instruction has not yet been received, the procedure goes to step S211, wherein a process of transmitting the operation data to the first game machine 30 is performed. Subsequent to step S211, in step S213, the second game machine 30 receives the data transmitted in above-described step S133 of FIG. 11, that is, the location of the relevant player character, a location of any other player character on the same sub-map, and a location of an enemy character on the same sub-map.

Subsequent to step S213, in step S215, a certain area centering on the location of the player character on the sub-map is set as a display area (the display area 240 of FIG. 6). Subsequent to step S215, in step S217, the relevant player character is displayed on the LCD 35. Subsequent to step S217, in step S219, any other player character, any enemy character, and other objects located on the sub-map within the display area set in step S215 are displayed. Further, in step S221, the sub-map within the display area set in step S215 is displayed. Subsequent to step S221, it is determined in step S223 whether or not the game has been cleared or over. If the game has been cleared or over, the game process ends. Otherwise, the procedure returns to step S201 of FIG. 12 for repeating the process.

As has been described above, in the present embodiment, the program for the second game machine as well as the program for the first game machine is stored in the DVD 50. Then, prior to start a game process, the program for the second game machine is transferred to the second game machine. Alternatively, the program for the second game machine can be stored in a game cartridge removably inserted in the second game machine.

In the above embodiment, the movement of every player character is controlled by the first game machine 20. Alternatively, each second game machine 30 can control the movement of every player character, and then transmit the control results to the first game machine.

Figure 13:
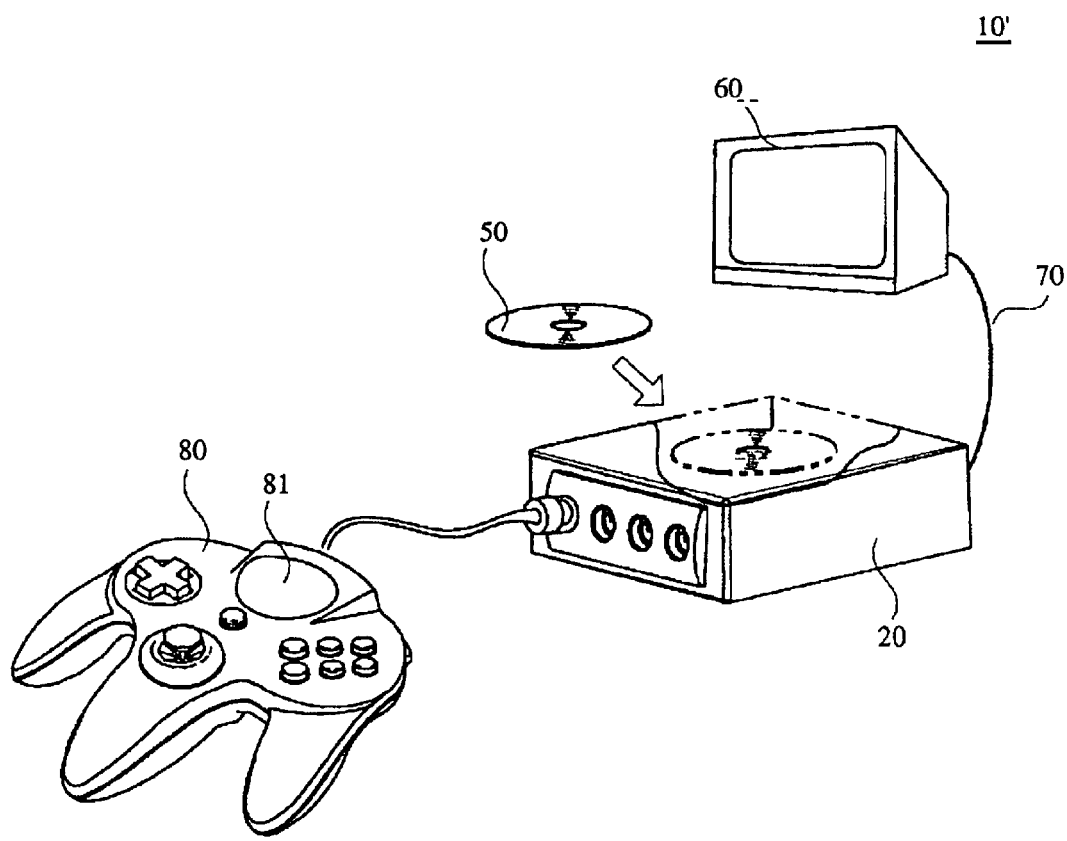
FIG. 13 is an external view of a system according to a modification of an exemplary non-limiting embodiment.

Still further, in the above embodiment, the game system is configured by the first game machine 20 and the second game machine 30. Alternatively, as illustrated in FIG. 13, a controller 80 having an LCD 81 is used instead of the second game machine 30 for configuring the game system. In this case, the image displayed on the LCD 35 in the above embodiment is displayed on the LCD 81. The image data for display on the LCD 81 is generated by the CPU 21 of the first game machine 20 executing a game program (having a function of both the program for the first game machine and the program for the second game machine in the present embodiment). The generated image data is transferred through a cable to the controller 80.

While the exemplary embodiments have been described in detail, the foregoing description is in all aspects illustrative and not restrictive. It is understood that numerous other modifications and variations can be devised without departing from the scope of the invention.

What is claimed is:

1. A game system to be played by a plurality of players, the game system including a plurality of operating mechanisms provided to the players, a plurality of individual displays provided to the players, and a common display commonly provided to the players, wherein a plurality of player characters appearing on game maps are controlled by each corresponding player operating each corresponding operating mechanism, the game system comprising:

first game map data storage locations which store data for displaying a first game map;

second game map data storage locations which store data for displaying at least one second game map;

an inter-game-map movement control processing mechanism which moves the player characters individually between the first game map and the second game map upon satisfaction of a predetermined condition;

common display control processing mechanism which displays player characters located on the first game map and at least a part of the first game map on the common display; and individual display control processing mechanism which displays a player character located on the second game map and at least a part of the second game map on an individual display provided to a player operating the player character located on the second game map.

2. The game system according to claim 1, wherein
   the first game map and the second game map each include at least one connecting point, the connecting point of the first game map corresponding to a predetermined point on the second game map and the connecting point of the second game map corresponding to a predetermined point on the first game map, and
   the inter-game-map movement control processing mechanism moves, upon arrival of the player character at the connecting point on the first game map, the player character to the predetermined point on the second game map corresponding to the connecting point, and moves, upon arrival of the player character at the connecting point on the second game map, the player character to the predetermined point on the first game map corresponding to the connecting point.

3. The game system according to claim 2, wherein
   the second game map data storage locations store a plurality of said second game maps, and the connecting point on the first game map corresponds to a predetermined point on any one of the plurality of said second game maps.

4. The game system according to claim 1, wherein the second game map data storage locations store a plurality of said second game maps, and based on a second game map on which a player character is located, the individual display control processing mechanisms select, from the plurality of said second game maps, the second game map on which the player character is located, and causes the selected second game map to be displayed on the individual display provided to a player who operates the player character located on the second game map.

5. The game system according to claim 1, wherein the common display control processing mechanism determines a display range of the first game map so that all player characters located on the first game map can be displayed on the common display.

6. The game system according to claim 1, wherein each point on the first game map corresponds to any one point on the second game map, and the common display control processing mechanism generates a predetermined display of a player character located on the second game map, at a point on the first game map corresponding to a point on the second game map at which the player character is located.

7. The game system according to claim 1, wherein in addition to the player characters, an enemy character appears on at least one of the first and second game maps, each point on the first game map corresponds to any one point on the second game map, and a player character located on the first game map can have an influence on any other player character and an enemy character located on the second game map, and a player character located on the second game map can have an influence on any other player character and an enemy character located on the first game map.

8. The game system according to claim 1, wherein a plurality of portable game machines provided to the players, each portable game machine having an operating mechanism and a display.

9. A computer-readable recording medium for recording a game program for a game system to be played by a plurality of players, the game system including a plurality of operating mechanisms provided to the players, a plurality of individual displays provided to the players, and a common display commonly provided to the players, wherein a plurality of player characters appearing on game maps are controlled by each corresponding player operating each corresponding operating mechanism, the game program causing the game system to function as:

first game map data storage locations which store data for displaying a first game map;

second game map data storage locations which store data for displaying at least one second game map;

inter-game-map movement control processing mechanism which moves the player characters individually between the first game map and the second game map upon satisfaction of a predetermined condition;

a common display control processing mechanism which displays player characters located on the first game map and at least a part of the first game map on the common display; and individual display control processing mechanism which displays a player character located on the second game map and at least a part of the second game map on individual displays provided to a player corresponding to the player character located on the second game map.

10. In a multi-player game system including a plurality of controllers respectively provided to players, a plurality of individual displays respectively provided to the players, and a common display commonly provided to the players, wherein a plurality of player characters appearing on game maps are controlled by each corresponding player operating each corresponding controller, a method of providing game play comprising:

displaying any of the player characters located on a first game map and at least a part of the first game map on the common display;

displaying a player character located on a second game map and at least a part of the second game map on an individual display provided to a player controlling the player character located on the second game map; and moving the player characters individually between the first game map and the second game map upon that individual player character's satisfaction of a predetermined condition.

11. The method as in claim 10, wherein the first game map includes at least one connecting point corresponding to a predetermined point on the second game map; and the method further comprises moving the player character to the predetermined point on the second game map corresponding to the connecting point of the first game map upon the arrival of the player character at the connecting point of the first game map.

12. The method as in claim 11, wherein the second game map includes at least one connecting point corresponding to a predetermined point on the first game map; and the method further comprises moving the player character to the predetermined point on the first game map corresponding to the connecting point of the second game map upon the arrival of the player character at the connecting point of the second game map.

13. The method as in claim 11, further comprising:

storing a plurality of said second game maps, wherein the connecting point on the first game map corresponds to a predetermined point on any one of the plurality of said second game maps.

14. The method as in claim 10, further comprising:

storing a plurality of said second game maps; and based on a second game map on which a player character is located, selecting, from the plurality of said second game maps, the second game map on which the player character is located, and displaying the selected second game map on the individual display provided to a player who controls the player character located on the second game map.

15. The method as in claim 10, further comprising determining a display range of the first game map so that all player characters located on the first game map can be displayed on the common display.

16. The method as in claim 10, wherein each point on the first game map corresponds to any one point on the second game map, and the method further comprises generating a predetermined display of a player character located on the second game map at a point on the first game map corresponding to a point on the second game map at which the player character is located.

17. In a multi-player video game system including a first controller operable by a first player to control a first player character and having a first individual display, a second controller operable by a second player to control a second player character and having a second individual display, and a common display provided for both the first and second players, a method comprising:

- displaying on the common display at least a part of a game map and any player character located on the game map;
- displaying on the first individual display at least a part of a sub-map and the first player character when the first player character is located on the at least part of the sub-map; and
- controlling inter-game-map movement by moving the first player character between the game map and the sub-map upon satisfaction of a predetermined condition.

18. The method as in claim 17, wherein upon arrival of the first player character at a connecting point on the game map, the first player character is moved from the game map to a corresponding point in the sub-map.

19. The method as in claim 17, wherein upon arrival of the first player character at a connecting point on the sub-map, the first player character is moved from the sub-map to a corresponding point on the game map.

20. The method as in claim 17, further comprising:

- displaying on the second individual display at least another part of the sub-map when the second player character is located on the at least another part of the sub-map; and
- controlling inter-game-map movement by moving the second player character between the game map and the sub-map upon satisfaction of a predetermined condition.

21. The method as in claim 17, further comprising:

- displaying on the second individual display at least part of another sub-map when the second player character is located on the least part of another sub-map; and
- controlling inter-game-map movement by moving the second player character between the game map and the another sub-map upon satisfaction of a predetermined condition.

22. A game system comprising:

- a plurality of controllers each having an individual display for displaying at least a portion of a sub-map to a player operating that controller; and
- a game console which is connectable to a common display for displaying a game map to all players, the game console having a processor which executes a videogame program to control inter-game-map movement so that player characters controlled by player operation on respective controllers move from the game map displayed on the common display to a point on the sub-map upon that player character's arrival at a connecting point on the game map and move from the sub-map to a point on the game map displayed on the common display upon that player character's arrival at a connecting point on the sub-map.

23. A game system comprising:

- a first controller having a first individual display for displaying at least a portion of a first sub-map to a player operating the first controller;
- a second controller having a second individual display for displaying at least a portion of a second sub-map to a player operating the second controller; and
- a game console which is connectable to a common display for displaying a game map to all of the players, the game console having a processor which executes a videogame program to control inter-game-map movement so that a first player character controlled by player operation on the first controller moves from the game map to the first sub-map upon the first player character's arrival at a connecting point on the game map and moves from the first sub-map to the game map upon the first player character's arrival at a connecting point on the first sub-map, and controls inter-game-map-movement so that the second player character controlled by player operation on the second controller moves from the game map to the second sub-map upon that player character's arrival at another connecting point on the game map and moves from the second sub-map to the game map upon the second player character's arrival at a connecting point on the second sub-map.

* * * * *